Sept. 23, 1958 J. M. HAIT 2,853,108
FRUIT TRANSFERRING AND REJECTING MEANS
Filed Feb. 26, 1952 7 Sheets-Sheet 1

INVENTOR.
JAMES M. HAIT
BY
Lyon & Lyon
ATTORNEYS

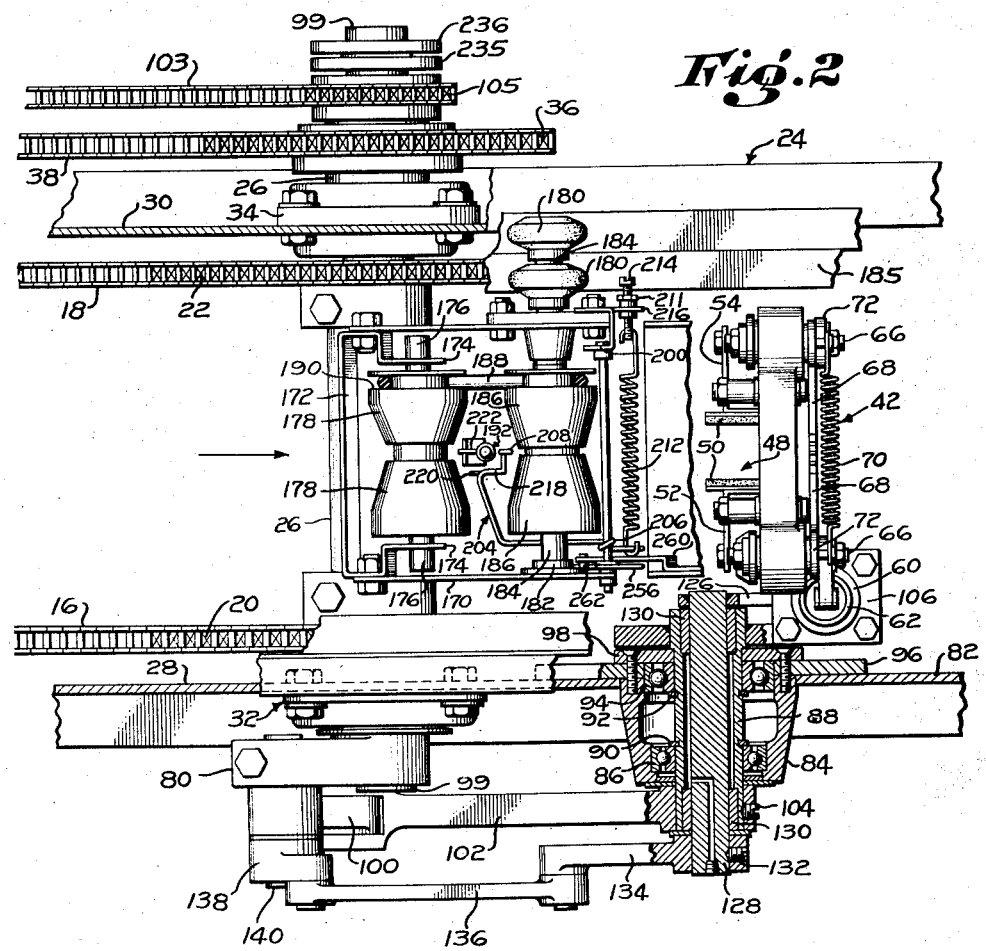

Sept. 23, 1958   J. M. HAIT   2,853,108
FRUIT TRANSFERRING AND REJECTING MEANS
Filed Feb. 26, 1952   7 Sheets-Sheet 3
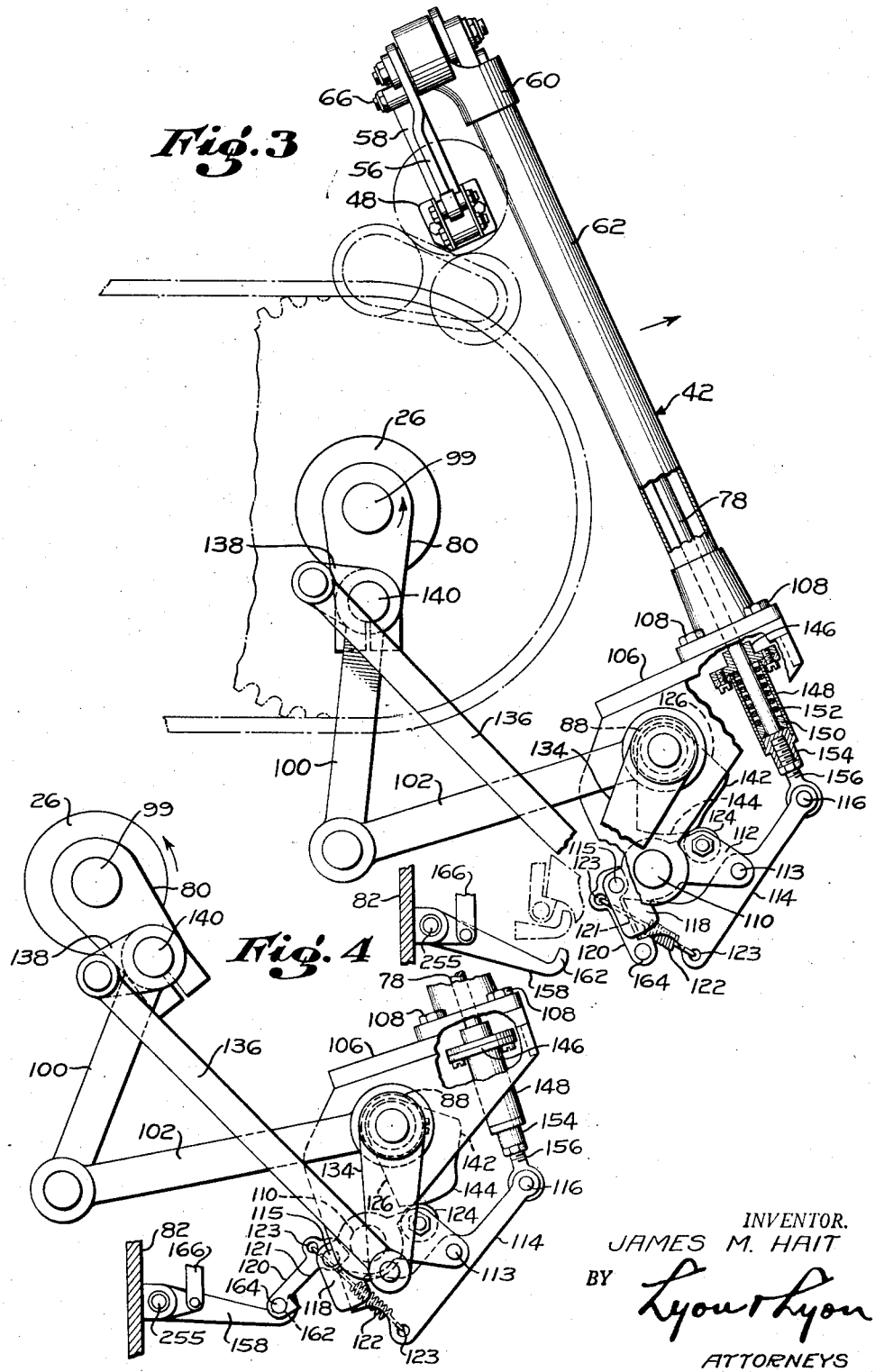
INVENTOR.
JAMES M. HAIT
BY Lyon & Lyon
ATTORNEYS

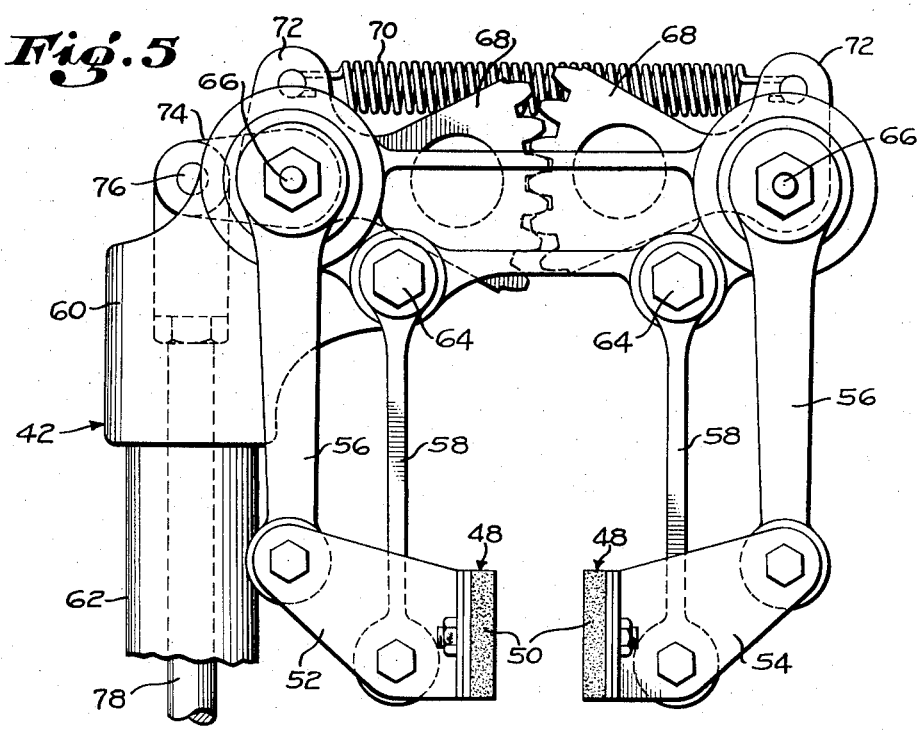
Fig. 5
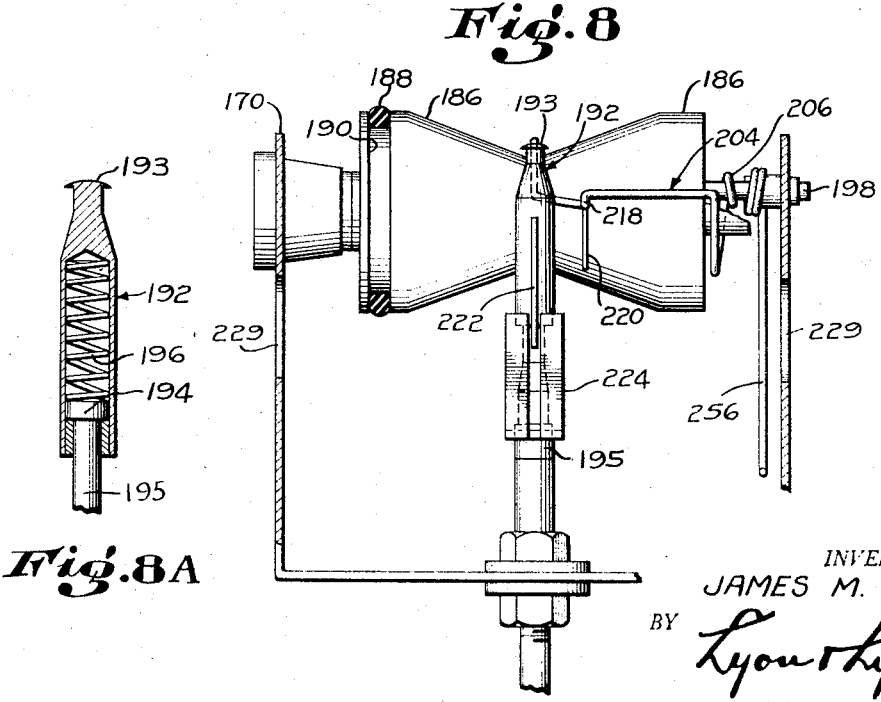
Fig. 8
Fig. 8A
INVENTOR.
JAMES M. HAIT
BY
Lyon & Lyon
ATTORNEYS Sept. 23, 1958  J. M. HAIT  2,853,108
FRUIT TRANSFERRING AND REJECTING MEANS
Filed Feb. 26, 1952  7 Sheets-Sheet 5

INVENTOR.
JAMES M. HAIT
BY
Lyon & Lyon
ATTORNEYS

Sept. 23, 1958 J. M. HAIT 2,853,108
FRUIT TRANSFERRING AND REJECTING MEANS
Filed Feb. 26, 1952 7 Sheets-Sheet 6

INVENTOR.
JAMES M. HAIT
BY Lyon & Lyon
ATTORNEYS

Sept. 23, 1958           J. M. HAIT           2,853,108
FRUIT TRANSFERRING AND REJECTING MEANS
Filed Feb. 26, 1952           7 Sheets-Sheet 7
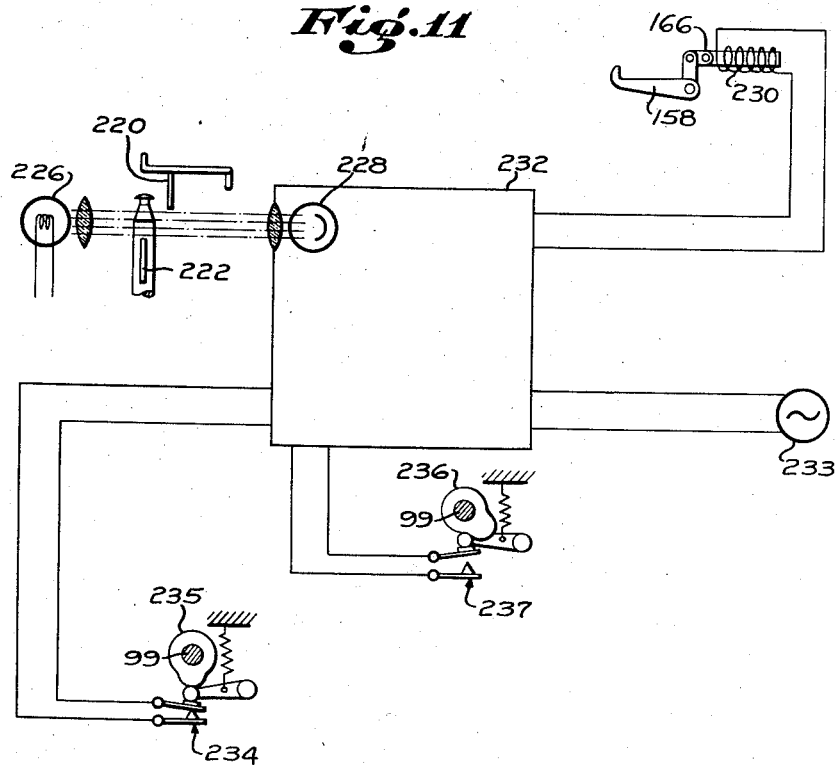
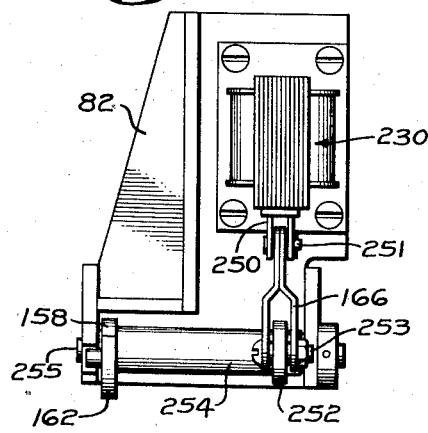
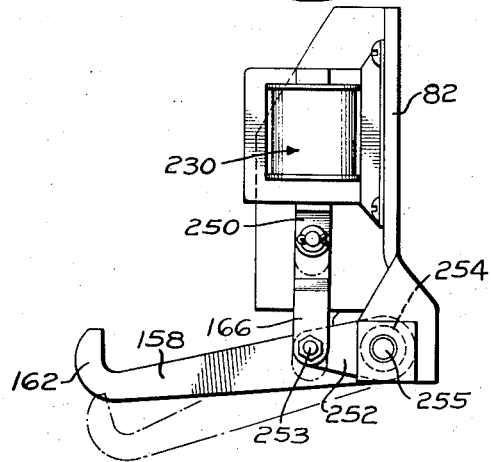
INVENTOR.
JAMES M. HAIT
BY
*Lyon+Lyon*
ATTORNEYS United States Patent Office 2,853,108
Patented Sept. 23, 1958

2,853,108

FRUIT TRANSFERRING AND REJECTING MEANS

James M. Hait, San Jose, Calif., assignor, by mesne assignments, to Food Machinery and Chemical Corporation, San Jose, Calif., a corporation of Delaware Application February 26, 1952, Serial No. 273,415

26 Claims. (Cl. 146—73)

This invention relates to a mechanism for feeding indented fruit to a processing machine, which fruit has been properly aligned for such processing machine, and rejecting fruit which is not properly aligned for said processing machine.

In referring to indented fruit I refer to fruit such as peaches, apricots and other similar or like fruit which has an indent and which indent has generally a major and minor diameter so that one of the diameters, here the major diameter, lies in a plane which serves as a reference plane for the processing of the fruit, such plane hereinafter being referred to as the suture plane.

The machine hereinafter described was particularly designed for feeding peaches to a processing machine. However the adaptation of this invention is not limited to such a machine, nor are its features of novelty limited to this particular fruit or its processing.

For many years fruit processing machines which have been utilized required hand feeding of the fruit because of the requirement that the fruit be fed to the machine in a particular position or in a particular plane of the fruit in order to obtain satisfactory processing. Recently various types of mechanisms have been developed for mechanically aligning a peach to the position required for proper processing thereof. In the utilization of these mechanisms it is not uncommon that a sizable percentage of the peaches thus conveyed to the processing machine will be improperly aligned through failure, for one reason or another, of the orienting mechanism.

It is an object of this invention to provide means for transferring fruit from a mechanical orienting mechanism to a processing machine.

It is a further object of this invention to provide means for rejecting fruit which has not been properly aligned by the orienting mechanism.

Another object of this invention is to provide means for disabling the fruit transferring means in the event that a fruit is not properly oriented for delivery to the processing machine.

Other objects and advantages will be apparent from the following description.

In the drawings:

Figure 2 is a top plan view of the fruit transfer means.

Figure 3 is a side elevation, partially in section, of the fruit transferring means in the operative or transferring position.

Figure 4 is a fragmentary side elevation of the disabling mechanism in the inoperative or reject position.

Figure 5 is a fragmentary rear elevation of the fruit engaging portion of the transfer means.

Figure 8 is a sectional view taken along line 8—8 of Figure 6.

Figure 8-A is a fragmentary elevation in section of the finder.

Figure 9:
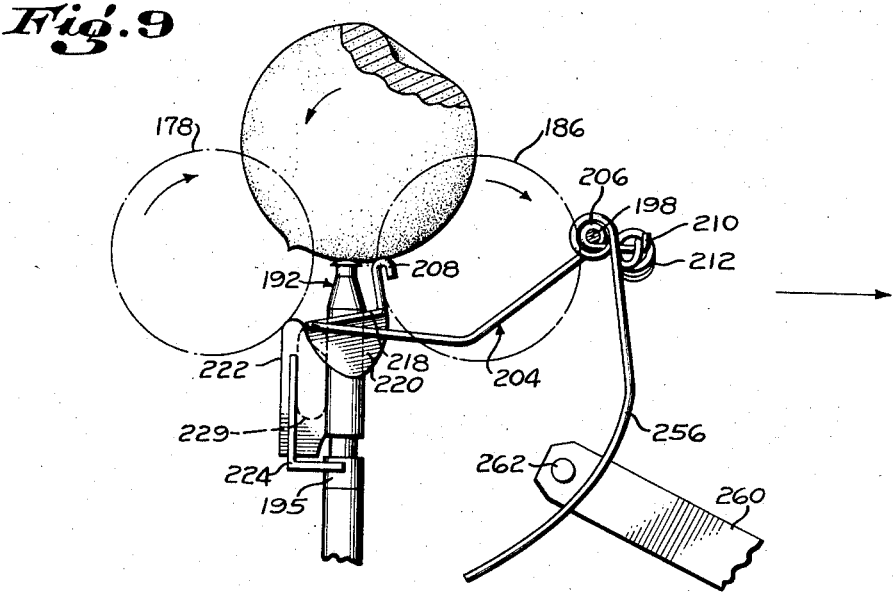

Figure 9 is a fragmentary side elevation of the fruit inspecting means with a misaligned peach supported upon the orienting mechanism.

Figure 10:
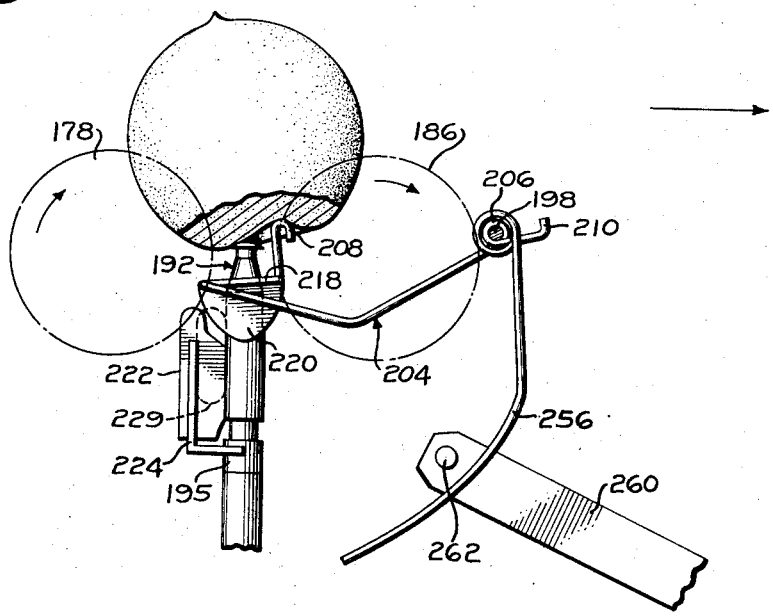

Figure 10 is a fragmentary side elevation of the fruit inspecting means with a properly aligned peach supported upon the orienting mechanism.

Figure 11 is a wiring diagram of the solenoid actuating circuit.

Figure 12 is a front elevation of the tripping means actuating mechanism.

Figure 13 is a side elevation of the tripping means actuating mechanism.

This application is a continuation-in-part of my prior application Serial No. 169,042, filed June 19, 1950, on Fruit Feeding and Orienting Means.

Figure 1:
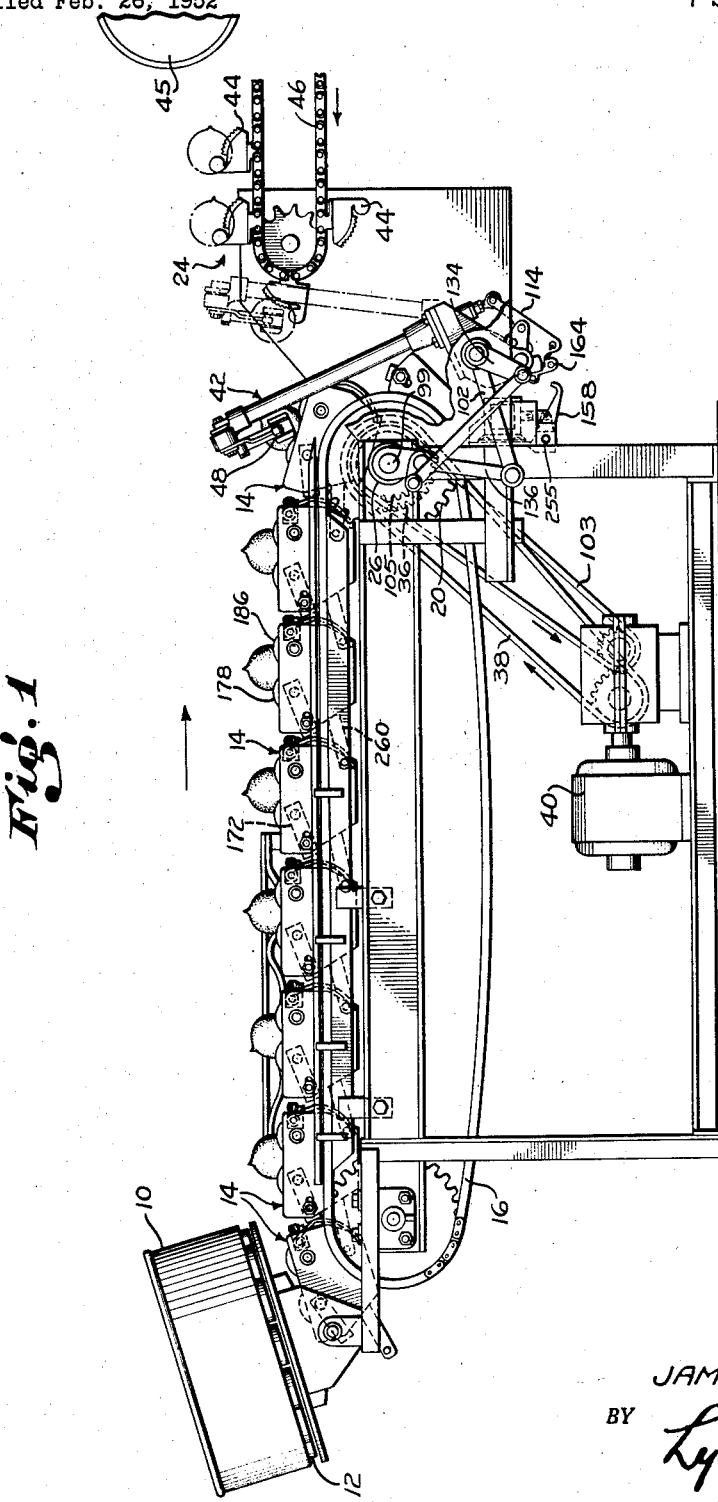
Figure 1 is a side elevation of the fruit orienting machine to which a transfer means embodying this invention is attached.

Referring now to Figure 1, fruit such as peaches are fed into a hopper 10 through which they pass one at a time through opening 12 onto a fruit orienting mechanism 14. The fruit orienting mechanisms may be of any suitable type such as that disclosed in my copending application, Serial No. 119,069, filed October 1, 1949. A number of these fruit orienting mechanisms 14 are spaced at intervals along the machine, each of the fruit orienting mechanisms being attached at each extremity thereof to a link of the spaced endless chains 16 and 18 (see Figure 2). The endless chains 16 and 18 are looped about sprockets 20 and 22 at the extremity of the machine adjacent the process machine, generally designated 24, and the opposite ends of the endless chains are looped about similar sprockets. The sprockets 20 and 22 are rigidly mounted upon hollow shaft 26, which shaft 26 is rotatably mounted between side plates 28 and 30 of the fruit orienting machine by bearings 32 and 34.

A sprocket 36 is rigidly mounted upon the hollow rotatable shaft 26 outside of the side wall 30 of the orienting machine over which a chain 38 is passed. The chain 38 is driven by any suitable source of power such as motor 40. Thus it is apparent that rotation of the chain 38 acting through the sprocket 36 and rotatable shaft 26 causes the sprockets 20 and 22 to rotate, driving the endless chains 16 and 18 carrying the fruit orienting mechanism 14 from the hopper 10 to the fruit transfer mechanism, generally designated 42, which is mounted upon the fruit processing machine at the extremity of said machine opposed to the hopper 10 in a manner which hereinafter will be described. The processing machine may be of any suitable form, one form of which is illustrated in the patent granted to Albert R. Thompson, No. 2,376,526, May 22, 1945 for a Continuous Peach Pitter. The fruit transfer mechanism 42 lifts the peaches from the fruit orienting mechanism 14 and delivers them to the impaling blades 44 of the fruit processing machine 24 in a manner hereinafter to be described. The transfer means then relinquishes its hold upon the fruit, which is carried by the impaling blades to the processing machine, wherein the fruit is sliced by the halving means herein illustrated as a circular saw 45 and then pitted. The processing machine may be driven in timed relation to the orienting machine by endless chain 46 (Figure 1) which is driven by motor 40.

This invention is concerned with the transfer means 42 and the associated fruit rejecting mechanism, their construction and operation, and is not concerned with either the fruit orienting machine or the fruit processing machine which heretofore have been generally described for the purpose of illustrating the purpose and operation of the transfer mechanism.

The transfer mechanism 42 may be constructed in the following manner. Gripping elements 48 (see Figure 5) are provided with a resilient rubber pad facing 50 and are adapted to grasp the peach during the transfer step. These gripping elements are carried at the ends of arms 52 and 54, which in turn are pivotally supported at the ends of parallel links 56 and 58. A bracket 60 is mounted at the upper end of the hollow oscillator post 62. The oscillator post 62, in a manner to be hereinafter described, moves gripping elements 48 from a position over the orienting mechanisms 14 to a position wherein the gripping elements 48 are positioned over an impaling blade 44; the orienting mechanism, transfer mechanism and impaling blades being operated in timed relationship with one another through a common drive to be hereinafter more fully described. Thus the transfer means functions to grasp the fruit between the gripping elements 48 when they are positioned over a fruit orienting mechanism, carries the fruit to the impaling blade 44 and releases the fruit when it is thus impaled upon blade 44. The links 58 are pivoted, as indicated at 64, and the links 56 are attached to pin 66 which is pivotally mounted to the bracket 60. The links 56 are provided with integral gear segments 68 which mesh together so that the actuation of one link 56 results in a corresponding actuation of the other link 56.

A spring 70 is connected between ears 72 of the links 56 and acts to normally hold the gripping elements 48 in open position. Means are provided to open or close the gripping elements, which means are herein illustrated as comprising an arm 74 which is secured to pin 66 to which the link 56 is secured. The arm 74 is secured by means of a pin 76 to an operating rod 78 which projects through the hollow oscillator post 62. Thus it is apparent that a downward motion of the operator rod 78 will cause the gripping elements 48 to move together, while when no downward force is exerted on the operating rods 78 the spring 70 functions to open the gripping elements 48.

The oscillator post 62 is caused to move from the fruit grasping position, over an orienting mechanism 14, to the fruit releasing position, over an impaling blade 44 in the following manner.

A casing 82, Figure 2, for the peach processing machine in this embodiment forms a continuation of the side walls 28 and 30 of the peach orienting machine. Casing 82 is provided with an aperture adapted to receive bearing box 84. Ball bearing 86 is inserted into the bearing box and a hollow tubular shaft 88 is inserted through the ball bearing 86. Shaft 88 is provided with stops 90 to retain the ball bearing 86 in the proper position. Stops 92 are also provided on the tubular shaft 88 to retain ball bearings 94 in the proper position in the bearing box 84. Bearing retaining plate 96 and cap 98 are then bolted to the bearing box 84 and the bearing box is inserted through and secured in the aperture in the casing 82, thereby providing a rotatable support for the hollow tubular shaft 88.

Rigidly secured to a solid rotatable shaft 99 is a crank 80 (Figures 2 and 3). Said shaft 99 extends through the hollow shaft 26 and is journaled in bearings provided within shaft 26. The shaft 99 is driven independently of but in timed relation to the shaft 26 by an endless chain 103 (Figure 2) which is looped about a sprocket 105 rigidly attached to shaft 99. The motor 40 may be utilized to drive chain 103 and thus shaft 99.

The crank 80 has pivotally connected thereto a link 100. A link 102 is pivotally connected to the link 100 at one extremity and rigidly secured as by set screw 104 to the hollow tubular shaft 88 at the other extremity. It is apparent that rotation of the shaft 99 through crank 80 and links 100 and 102 will cause the tubular shaft 88 to oscillate and the amount of rotary oscillation of the shaft 88, of course, can be controlled by the size of the links 100, 102. Rigidly secured to the shaft 88 is a bracket 106 upon which the oscillator post 62 is mounted as by bolts 108. Thus it is apparent that rotation of shaft 99 causes the shaft 88 to oscillate, which in turn oscillates the bracket 106 causing the oscillator post 62 to rock from the fruit receiving position to the fruit releasing position and back again as hereinbefore described.

Pivoted to the bracket 106, about pin 110, is a link 112. Pivotally mounted about pin 113 to the link 112 at one extremity thereof is a lever 114. Said lever at one extremity thereof is pivotally connected to a rod associated with the operating rod 78 as at 116. At the other extremity of the lever 114 a latch portion 118 is formed. Pivotally mounted about pin 115, upon the link 112 at the extremity opposed from the pivotal connection of the lever 114 to said link, is a latch member 120 having a recess 121, adapted to receive the latch portion 118 of lever 114. Spring 122 is secured at its extremities, about suitable pins 123, to the latch member 120 and to the lever 114, tending to force the latching portion 118 of the lever 114 into the locking portion of the latch 120. When the latch 120 and the latching portion 118 are in engagement, as seen in Figure 3, the link 112, lever 114 and latch 120 pivot about pin 110 as a single mechanism. Mounted upon the link 112 is a cam follower 124 which is adapted to contact and be guided by the contour of cam 126, which is pivotally mounted upon the bracket 106. As best seen in Figure 2, the cam 126 is rigidly attached to the shaft 128 which is adapted to be inserted through the hollow shaft 88. Suitable bearing members 130 are provided to guide the shaft 128 and to permit its rotation with respect to the tubular shaft 88. Rigidly connected as by set screw 132 to the shaft 128 is a link 134. Pivotally connected to the link 134 is a link 136, which in turn is pivotally connected to the link 138 which is rigidly connected to the crank 80 about pin 140. Thus rotation of shaft 99 imparts an oscillating rotary motion to the shaft 128 by rotation of the crank 80 through linkage 134, 136 and 138. This oscillating rotating motion of the shaft 128 causes the rigidly connected cam 126 to oscillate back and forth with respect to the bracket 106. The cam 126 is provided with a lower surface 142 and a step 144. When the cam follower 124 strikes the step 144 it causes the link 112 to pivot about pin 110, pivoting the upper extremity of the lever 114 away from the oscillator post 62, exerting downward force on the operating rod 78, causing the fruit retaining members 48 to close upon the peach retained on the fruit orienting mechanism 14, as hereinbefore described. The oscillator post then pivots toward the impaling blades 44 as hereinbefore described. When the cam follower 124 once again passes over the step 144 on the cam 126, the lever 114 is rotated counterclockwise and the upper extremity thereof moves toward the oscillator post 62, due to the urging of spring 70, which also causes the gripping elements 48 to move apart from one another, releasing their hold upon the fruit, this releasing action being so timed as to correspond to the impaling of the fruit on the impaling blade 44.

A yieldable connection (Figure 3) is provided between the lever 114 and the operating rod 78, which includes a guide 146 which is journaled on rod 78 and to which a sleeve 148 is secured. Ring 150 is secured to rod 78 and adapted to reciprocate in sleeve 148 and a spring 152 is retained in sleeve 148 between guide 146 and ring 150. The sleeve 148 is threadably retained by collar 154 which in turn threadably receives one extremity of rod 156. The other extremity of rod 156 terminates in the pivotal connection 116 to lever 114. Thus when a downward force is imparted to operating rod 78 to close the gripping elements 48, a yieldable connection is provided which permits the gripping elements to stop when they have engaged the surface of the fruit with the force necessary to lift them, and any further movement imparted by lever 114 is absorbed by compression of the spring 152, thus accommodating the mechanism to any size peach.

In the event that a peach is improperly aligned for delivery by the transfer mechanism to the impaling blades 44, the transfer mechanism is disabled so that the gripping elements do not close on a peach delivered by the fruit orienting mechanism 14. This disabling of the transfer mechanism may be accomplished by a disengaging claw 158. One extremity of this claw is pivotally mounted to the casing 82, in a manner hereinafter to be described, of the fruit processing machine and the other extremity 162 is curved to fit partially around pin 164 which is mounted upon latch member 120. When the claw 158 is pivoted upwardly, the curved extremity 162 passes into the path of pin 164 and prevents its moving when the oscillator post 62 approaches the fruit receiving position and cam follower 124 passes over step 144 on cam 126 causing link 112 to pivot as previously described. This holding of pin 164, as the remainder of the disabling mechanism continues to rotate counterclockwise toward the fruit receiving position (as seen in Figures 3 and 4), trips the latch formed between lever 114 and latch member 120. When the latch is tripped, lever 114 is free to pivot about pin 113 and no downward force is exerted upon the operating rod 78 by rotation of link 112. Thus the gripping elements fail to close on the misaligned peach which is delivered by the fruit orienting mechanism 14 to a suitable receptacle (not shown).

When the transfer mechanism pivots toward the fruit processing machine, as previously described, the pin 164 moves away from the claw 158, said claw being pivoted downwardly in a manner hereinafter to be described, and spring 122 pulls the lever 114 and latch member 120 into the latching position so that the next time the transfer mechanism is in the fruit receiving position the gripping elements 48 will close upon a peach, the lever 114, latch member 120 and link 112 pivoting as a single element.

The claw 158 is preferably raised into the disengaging position by a toggle 166 which is suitably attached to a solenoid 230 in a manner hereinafter to be described. When the solenoid is not energized, the claw 158 is in its normal lowered position so that the curved extremity 162 is out of the path of pin 164 and thus the claw will not unlatch lever 114.

Figure 6:
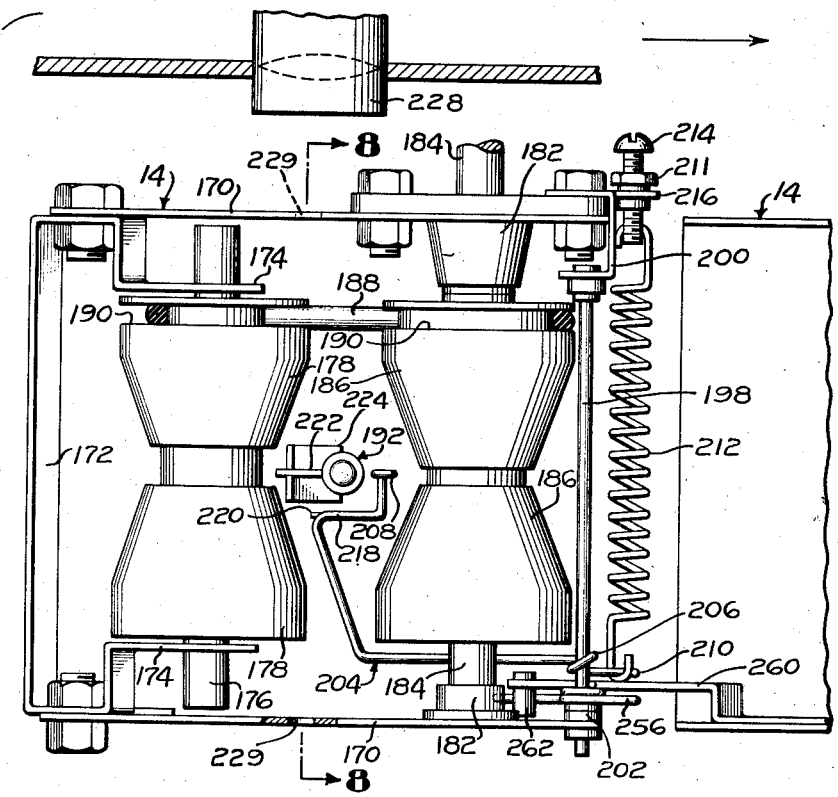
Figure 6 is an enlarged top plan view of the fruit orienting and rejecting means.
Figure 7:
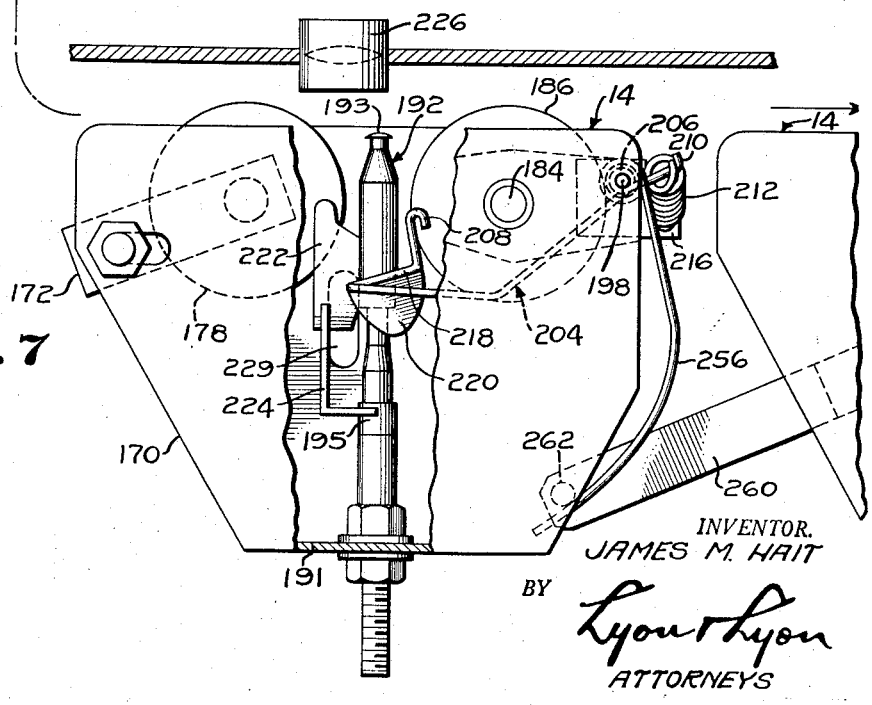
Figure 7 is a side elevation of the fruit orienting and rejecting means.

The frame of the fruit orienting mechanism 14 (see Figures 6, 7 and 8) comprises side walls 170 to which end wall 172 is attached as by bolts. The extremities of end wall 172 project into the frame forming bearings 174 which rotatably support shaft 176, upon which the conical rollers 178 are mounted. Upon a similar shaft 184 corresponding conical rollers 186 are mounted and suitably mounted on side wall 170 are bearings 182 which rotatably support driven shaft 184. At one extremity of shaft 184 (Figure 2) suitable rollers 180 are mounted which bear against guideways 185 formed in the frame of the fruit orienting machine. The movement of the orienting mechanisms 14 thus rotates shaft 184 by rollers 180 bearing against guideways 185. Endless belt 188 passes around pulleys 190 formed on shafts 176 and 184 so that all four conical rollers are rotated in a clockwise direction upon movement of the fruit orienting mechanism 14 toward the transfer means 42. The four conical rollers are positioned on shafts 176 and 184 so as to form a pocket between said rollers. In this pocket finder 192 is mounted upon support rod 195 which in turn is secured to the base 191 of the fruit orienting mechanism frame.

The finder 192 comprises a finder head 193 (Figure 8-A) which is hollow at its lower extremity and adapted to fit upon the upper extremity 194 of the support rod 195. A spring 196 is also retained in the finder head 192 which tends to force the finder upwardly. The finder functions to locate the calyx indent of a peach as it is supported and rotated by the conical rollers 178, 186 in much the same manner as described in my co-pending application Serial No. 119,069, filed October 1, 1949.

At the leading edge of the fruit orienting mechanism a shaft is rotatably mounted in bracket 200 and bearing 202, which in turn are suitably mounted to the opposed side walls 170. A wire 204 is coiled around the shaft 198, as at 206, and is suitably welded or otherwise secured to said shaft. This wire projects from the shaft 198 to the inner extremity of the adjacent roller 186 where it is bent inwardly towards the center of a pocket formed between the conical rollers 178 and 186. The inner extremity or inspector 208 is bent upwardly so as to lie approximately within a fore and aft vertical plane passing through the vertical axis of the finder 192.

At the opposite extremity 210 of the wire inspector a torsion spring 212 is suitably attached. The opposite extremity of the torsion spring 212 is secured to adjusting screw 214 which is threadably mounted in bracket 216, which in turn is suitably attached to the side wall 170. By rotating the adjusting screw 214, the moment exerted by the spring 212 on the extremity 210 of the wire 204 may be varied. A set nut 211 is provided to lock the adjusting screw when the desired tension is created. The torsion spring 212 urges the wire 204 to rotate shaft 198 so that the inspector 208 tends to move upwardly with respect to the base 191. The wire 204 is formed so that the inspector 208 may normally be held below the level of the finder 192 (see Figure 7) by a wire 256 welded or otherwise secured to the shaft 198 at one extremity and a tripping bar 260 secured to the rear extremity of the preceding orienting mechanism 14. The tripping bar 260 has a pin 262 at its rear extremity, which pin normally bears down upon a rearwardly and downwardly extending portion of the wire 256, thereby holding the shaft 198 (Figure 7) in a counterclockwise rotated position against the urge of the spring 212 and maintaining the inspector 208 below the upper end of the finder 192.

When a peach is placed on the fruit orienting mechanism through the hopper 10, the finder 192 assumes the position illustrated in Figure 9, the weight of the fruit compressing the spring 196 in the finder. As the conical rollers 178 and 186 cause the fruit to rotate in a counterclockwise direction, the calyx indent is located by the spring loaded finder 192, the fruit then assuming the position illustrated in Figure 10. At this position the fruit is in a stable position, being retained by the finder 192 and prevented from further rotation.

The wire 204 is provided with a flag bearing segment 218 adjacent the inspector 208. In this embodiment the flag bearing segment is at approximately a right angle to the inspector and suitably attached to this segment is flag 220. Mounted on the finder 192 is a fin 222 which is raised and lowered with the finder. The fin is guided by a slot in bracket 224 which is rigidly attached to support rod 195 (see Figures 6 and 7). On the frame of the fruit orienting machine at a position adjacent to but slightly before the place where the fruit transfer means 42 receives fruit from the fruit orienting mechanism 14, a light source such as lamp 226 is mounted (see Figure 6). On the opposite side of the frame from the light source 226 is a receiving photoelectric cell 228.

A pair of apertures 229 are provided in the side walls 170 of each fruit orienting mechanism 14, said apertures being adapted to register with the light source 226, the photoelectric cell 228 and the flag 220 and the fin 222. As each fruit orienting mechanism 14 advances towards the fruit transfer station, at a point just preceding that where the apertures 229 register with the light source 226 and photoelectric cell 228, the pin 262 on the preceding tripping bar 260 will move upwardly and away from the wire 256, as seen in Figures 9 and 10, due to the rotation of the preceding fruit orienting mechanism 14 downwardly around the sprockets 20 and 22 (see Figures 1 and 2). Such movement of the pin 262 releases the wire 204 and allows it to fly upwardly under the urge of the spring 212 into a fruit contacting position.

When a peach is properly aligned upon the conical rollers 178 and 186, due to the protrusion of finder 192 into the calyx indent of the fruit, as seen in Figure 10, the released inspector 208 will enter the calyx indent of the peach and come to rest above the level of the finder 192. In this event the flag 220 and fin 222 will be spaced apart from one another and light will be permitted to pass to the photoelectric cell 228. When, however, the peach is not properly aligned, as seen in Figure 9, the inspector 208 will assume the same height as finder 192 and the flag 220 will overlie the fin 222, thus preventing the light from lamp 226 from reaching the receiving photoelectric cell 228.

The control circuit diagrammatically shown in Figure 11 functions to energize the reject solenoid 230 when the light from the lamp 226 to the photo tube 228 is interrupted by the flag and fins 220, 222. The photo tube 228 is a part of a photoelectric register control circuit 232 (Figure 11), herein represented by a box, details of said circuit being omitted since it forms no part of the present invention and is currently available in a variety of designs capable of performing the desired solenoid control function. The control circuit 232 is energized by a source of alternating current 233. Said circuit 232 is adapted to respond only to signals received by the tube 228 when the apertures 229 in the orienting mechanisms 14 are aligned with said tube 228. This control of the circuit 232 is occasioned by a switch 234 connected with said circuit 232. Said switch 234 is adapted to be closed at the instant of registry between said apertures 229 and the photo tube 228 by a cam 235 secured on the shaft 99 (Figures 2 and 11). As hereinbefore described, the shaft 99 is rotated in timed relation to the hollow shaft 26, said shaft 99 making one complete revolution for each fruit orienting mechanism 14 that passes the photo tube 228. If the flag 220 and the fin 222 are spaced from one another so as to transmit light from the source 226 to the tube 228 when the switch 234 is closed, the register control circuit 232 will not cause the energization of the solenoid 230 and no rejection of properly aligned fruit on the orienting mechanism 14 will occur. However, should the flag and fin be overlapped so that no light will reach the tube 228 when the switch 234 is closed, the circuit 232 is constructed so as to cause energization of the solenoid 230, which results in the rise of the claw 158 and the subsequent rejection of the fruit. The circuit 232 is so constructed that the solenoid 230 will remain energized after the cam 235 allows the switch 234 to open. However, shortly after the opening of the switch 234 a cam 236 secured on the shaft 99 is adapted to close a switch 237 connected with the circuit 232, whereupon said circuit 232 will cause de-energization of the solenoid 230, in case it has been energized. Should the solenoid 230 be in its normal condition of de-energization when the switch 237 is closed, the circuit 232 will not effect any change in this condition. Thus, after disabling of the transfer mechanism by the rise of the claw 158 into the path of the pin 164, the claw 158 is returned to its inoperative position due to the de-energization of the solenoid 230 before the next succeeding orienting mechanism 14 reaches the inspection station, as has been previously described.

The reject solenoid 230, as previously described, is suitably mounted upon frame 82 of the fruit processing machine. A pair of tongues 250, which are moved upwardly by the solenoid when energized, are pivotally connected by pivot pin 251 to toggle 166 (see Figures 12 and 13). A lug 252 is pivotally connected by pin 253 to the lower extremity of toggle 166. This lug is also rigidly secured to sleeve 254 which is rotatably mounted upon rod 255 which is mounted in suitable brackets formed on frame 82. Thus when the solenoid 230 is energized the tongues 250 are raised, as shown in full lines in Figure 13, which causes sleeve 254 to rotate clockwise through the linkage formed by toggle 166 and lug 252. The claw 158 is rigidly secured to the sleeve 254 and when the sleeve is rotated clockwise the claw 158 is raised thus placing the curved extremity 162 in position for disabling the transfer means 42, as previously described. When the solenoid is not energized, that is, when light passes between flag 220 and fin 222 to the photo tube 228, the tongues 250 remain lowered and the claw 158 remains in its normal position below the position where it will engage pin 164.

The operation of this device contemplates fruit such as peaches or the like being fed into a hopper 10 and individually through an opening 12 to one of a series of spaced fruit orienting mechanisms 14. By the rotation of the conical rollers 178 and 186 the calyx indent of the fruit is found by the finder 192. The orienting mechanism is carried by the endless chains 16 and 18 to the sprockets 20 and 22, at which time the pin 262 rises causing the inspector 208 to be raised into the calyx indent of the properly oriented fruit. The mechanism 14 then passes by the inspecting station where the photo tube 228 receives a signal that the fruit is properly aligned. When the mechanism 14 reaches the fruit transferring station the transfer means 42 has pivoted to the fruit receiving position, the gripping elements 48 then grasp the fruit, the transfer means 42 then pivots towards the fruit processing machine and releases the fruit to an impaling blade 44. In the event that a fruit is not properly aligned for transfer to the fruit processing machine, the inspector 208 and finder 192 are held at the same height by the weight of the fruit which causes the flag 220 and the fin 222 to overlap, preventing light from lamp 226 from reaching the photoelectric cell 228 as the mechanism 14 passes the inspecting station. This causes the solenoid 230 to be energized through the photoelectric register control circuit illustrated diagrammatically in Figure 11. The solenoid raises the claw 158 placing it in position to engage pin 164, whereupon the subsequent engagement therebetween unlatches the lever 114 so that the gripping elements 48 are not closed upon the fruit when the mechanism 14 reaches the fruit transferring station. The fruit then is carried by the orienting mechanism to a suitable receptacle from which it is returned to the hopper 10.

While what hereinbefore has been described is the preferred embodiment of this invention, it is readily apparent that many changes in the size, shape and construction of the component elements can be resorted to without departing from the scope of this invention or the appended claims.

I claim:

1. A device for inspecting orientation of fruit and rejecting misaligned fruit comprising: fruit grasping members, an operating rod operatively connected to and controlling the opening and closing of said grasping members, means for actuating said operating rod to close said grasping members upon a fruit, and means for disabling said actuating means when a fruit is misaligned.

2. A device for inspecting orientation of fruit and rejecting misaligned fruit comprising: fruit grasping members, an operating rod operatively connected to and controlling the opening and closing of said grasping members, means for actuating said operating rod to close said grasping members upon a fruit, said means including a latch, and means for tripping said latch and thereby disabling said actuating means when a fruit is misaligned.

3. A device for inspecting orientation of fruit and rejecting misaligned fruit comprising: fruit grasping members, an operating rod operatively connected to and controlling the opening and closing of said grasping members, a bracket associated with said operating rod, a cam pivotally mounted upon said bracket, a link pivotally mounted on said bracket, a cam follower mounted upon said link and bearing against said cam, a lever pivotally mounted to said link and attached to said operating rod at one extremity, latch means locking movement of said lever to said link, means for rotating said cam to cause said lever to actuate said operating rod and close said fruit grasping members upon a fruit, and means for tripping said latch means when a fruit is misaligned for transfer.

4. A device for inspecting orientation of fruit and rejecting misaligned fruit comprising: fruit grasping members, an operating rod operatively connected to and controlling the opening and closing of said grasping members, a bracket associated with said operating rod, a cam pivotally mounted upon said bracket, a link pivotally mounted on said bracket, a cam follower mounted upon said link and bearing against said cam, a lever pivotally mounted to said link and attached to said operating rod at one extremity and having a latch portion at the other extremity, a latch member adapted to lock said latch portion so that said link, lever and latch member pivot together, means for rotating said cam to cause said lever to actuate said operating rod and close said grasping members upon a fruit, and latch tripping means for disengaging said latch member when fruit is misaligned for transfer.

5. A device for inspecting orientation of fruit and rejecting misaligned fruit comprising: fruit grasping members, an operating rod operatively connected to and controlling the opening and closing of said grasping members, a bracket associated with said operating rod, a cam pivotally mounted upon said bracket, a link pivotally mounted on said bracket, a cam follower mounted upon said link and bearing against said cam, a lever pivotally mounted to said link and attached to said operating rod at one extremity and having a latch portion at the other extremity, a latch member adapted to lock said latch portion so that said link, lever and latch member pivot together, means for rotating said cam to cause said lever to actuate said operating rod and close said grasping members upon a fruit, a pin on said latch member, claw means for engaging said pin, and means for moving said claw means into the pin engaging position when a fruit is misaligned for transfer.

6. Disabling means for a fruit transfer device of the type having fruit grasping elements operatively connected to and actuated by a longitudinal force upon an operating rod comprising: means for exerting a longitudinal force upon said operating rod, and means for disabling said force exerting means when a fruit does not have its plane of suture in a predetermined plane for transfer.

7. Disabling means for a fruit transfer device of the type having fruit grasping elements operatively connected to and actuated by a longitudinal force upon an operating rod comprising: means for exerting a longitudinal force upon said operating rod, said means including latching means, and means for tripping said latching means and thereby disabling said force exerting means when a fruit does not have its plane of suture in a predetermined plane for transfer.

8. Disabling means for a fruit transfer device of the type having fruit grasping elements actuated by a longitudinal force upon an operating rod comprising: a bracket, a cam pivotally mounted on said bracket, a link pivotally mounted on said bracket, a cam follower mounted on said link and adapted to bear against said cam, a lever pivotally mounted to said link and attached at one extremity to said operating rod, latch means locking movement of said lever to said link, means for rotating said cam to pivot said lever and exert a longitudinal force on said operating rod, and means for tripping said latch means when a fruit is misaligned for transfer.

9. Disabling means for a fruit transfer device of the type having fruit grasping elements actuated by a longitudinal force upon an operating rod comprising: a bracket, a cam pivotally mounted on said bracket, a link pivotally mounted on said bracket, a cam follower mounted on said link and adapted to bear against said cam, a lever pivotally mounted to said link and attached at one extremity to said operating rod and having a latch portion at the other extremity, a latch member adapted to lock said latch portion so that said link, lever and latch member pivot together, means for rotating said cam to cause said lever to exert a longitudinal force upon said operating rod, and latch tripping means for disengaging said latch when a fruit is misaligned for transfer.

10. Disabling means for a fruit transfer device of the type having fruit grasping elements actuated by a longitudinal force upon an operating rod comprising: a bracket, a cam pivotally mounted on said bracket, a link pivotally mounted on said bracket, a cam follower mounted on said link and adapted to bear against said cam, a lever pivotally mounted to said link and attached at one extremity to said operating rod and having a latch portion at the other extremity, a latch member adapted to lock said latch portion so that said link, lever and latch member pivot together, means for rotating said cam to cause said lever to exert a longitudinal force upon said operating rod, a pin on said latch member, claw means for engaging said pin, and actuating means for moving said claw means into the pin engaging position when a fruit is misaligned for transfer.

11. In a fruit orienting mechanism of the type having a frame with rotatable frusto-conical rollers spaced from one another so as to form a pocket and a spring loaded finder in said pocket, the combination with said fruit orienting mechanism of an inspector adapted to probe the surface of a fruit rotated in said orienting mechanism, a light interrupting member attached to said inspector, a complementary light interrupting member attached to said finder, said light interrupting members overlapping when said inspector engages a misaligned fruit and spaced apart when said inspector enters the calyx indent of a fruit properly aligned in said fruit orienting mechanism and means for projecting a light beam interrupted by said light and complementary light interrupting members when said members overlap.

12. In a fruit orienting mechanism of the type having a frame with rotatable frusto-conical rollers spaced from one another so as to form a pocket and a spring finder in said pocket, the combination with said fruit orienting mechanism of a rod rotatably mounted in said frame, an inspector adapted to probe the surface of a fruit rotated in said orienting mechanism and secured to said rod so as to project into said pocket adjacent said finder, means tending to rotate said rod to raise said inspector in said pocket, a light interrupting member attached to said inspector, and a complementary light interrupting member attached to said finder, said light interrupting members overlapping when said inspector engages a misaligned fruit and spaced apart when said inspector enters the calyx indent of a fruit which has been located by said finder and means for projecting a light beam interrupted by said light and complementary light interrupting members when said members overlap.

13. In a fruit orienting mechanism of the type having a frame with rotatable frusto-conical rollers spaced from one another so as to form a pocket and a spring loaded finder in said pocket, the combination with said fruit orienting mechanism of a rod rotatably mounted in said frame, an inspector adapted to probe the surface of a fruit rotated in said orienting mechanism and secured to said rod so as to project into said pocket adjacent said finder, means tending to rotate said rod to raise said inspector in said pocket, a light interrupting member attached to said inspector, a complementary light interrupting member attached to said finder, said light interrupting members overlapping when said inspector engages a misaligned fruit and spaced apart when said inspector enters the calyx indent of a fruit located by said finder, and means normally restraining said inspector below the level of said finder and means for projecting a light beam interrupted by said light and complementary light interrupting members when said members overlap.

14. In a fruit orienting mechanism of the type having a frame with rotatable frusto-conical rollers spaced from one another so as to form a pocket and a spring loaded finder in said pocket, the combination with said fruit orienting mechanism of a rod rotatably mounted in said frame, an inspector adapted to probe the surface of a fruit rotated in said orienting mechanism and secured to said rod so as to project into said pocket adjacent said finder, means tending to rotate said rod to raise said inspector in said pocket, a light interrupting member attached to said inspector, a complementary light interrupting member attached to said finder, said light interrupting members overlapping when said inspector engages a misaligned fruit and spaced apart when said inspector enters the calyx indent of a fruit located by said finder, a tripping member attached to said rod, and means actuating said tripping member to normally restrain said inspector below the level of said finder and means for projecting a light beam interrupted by said light and complementary light interrupting members when said members overlap.

15. A device for inspecting the suture plane alignment of a fruit comprising: a light source, a light responsive receiver, a yieldable inspector adapted to scan the surface of a fruit while said fruit is being oriented, light interrupting means operatively connected to and actuated by said inspector to terminate passage of light from said light source to said light responsive receiver when said fruit is misaligned.

16. In a fruit orienting mechanism of the type having rotatable frusto-conical rollers spaced from one another to form a pocket and spring loaded finder in said pocket, the combination with said orienting mechanism of a light source, a light responsive receiver on the opposite side of said orienting mechanism from said light source, a yieldable inspector adjacent said finder, a light interrupting member carried by said inspector, and a complementary light interrupting member carried by said finder, said light interrupting members overlapping and preventing passage of light from said source to said receiver when said yieldable inspector is at the same height as said finder.

17. A device for inspecting orientation of fruit and rejecting misaligned fruit comprising: fruit grasping members, an operating rod operatively connected to and controlling the opening and closing of said grasping members, means for actuating said operating rod to close said grasping members upon a fruit, a yieldable inspector adapted to probe a fruit while said fruit is being oriented, and means for disabling said actuating means when said inspector indicates a fruit is misaligned.

18. A fruit transfer and rejecting device comprising: fruit grasping members, an operating rod, means for actuating said operating rod to close said grasping members upon a fruit, a yieldable inspector adapted to probe the surface of a fruit while said fruit is being oriented, a light source, a light responsive receiver, light interrupting means actuated by movement of said inspector interrupting passage of light to said receiver when a fruit is misaligned, and means responsive to said receiver when light is interrupted for disabling said operating rod actuating means.

19. A device for inspecting orientation of fruit and rejecting misaligned fruit comprising fruit grasping members, an operating rod operatively connected to and controlling the opening and closing of said grasping members, means for actuating said operating rod to close said grasping members upon a fruit, said actuating means including a latch, a yieldable inspector adapted to probe a fruit while said fruit is being oriented, and means for tripping said latch and thereby disabling said actuating means when said inspector indicates a fruit is misaligned.

20. A device for inspecting orientation of fruit and rejecting misaligned fruit comprising: fruit grasping elements, an operating rod operatively connected to and controlling the opening and closing of said grasping members, a bracket movably mounted upon said operating rod, a cam pivotally mounted upon said bracket, a link pivotally mounted upon said bracket, a cam follower mounted upon said link and bearing against said cam, a lever pivotally mounted to said link and attached at one extremity to said operating rod, latch means locking movement of said lever to said link, means for rotating said cam to actuate said operating rod and close said fruit grasping elements upon a fruit, a yieldable inspector adapted to probe a fruit while said fruit is being oriented, and means for tripping said latch when said inspector indicates a fruit is misaligned.

21. A fruit transfer and rejecting device comprising: fruit grasping elements, an operating rod, a bracket attached to said operating rod, a cam pivotally mounted upon said bracket, a link pivotally mounted upon said bracket, a cam follower mounted upon said link and bearing against said cam, a lever pivotally mounted to said link and attached at one extremity to said operating rod, latch means locking movement of said lever to said link, means for rotating said cam to actuate said operating rod and close said fruit grasping elements upon a fruit, a light source, a light responsive receiver, a yieldable inspector adapted to probe the surface of a fruit while said fruit is being oriented, light interrupting means actuated by said inspector to terminate passage of light from said light source to said receiver when a fruit is misaligned, and means actuated by said receiver to trip said latch when passage of light to said receiver is interrupted.

22. A fruit transfer and rejecting device comprising: fruit grasping elements, an operating rod, a bracket attached to said operating rod, a cam pivotally mounted upon said bracket, a link pivotally mounted upon said bracket, a cam follower mounted upon said link and bearing against said cam, a lever pivotally mounted to said link and attached at one extremity to said operating rod, latch means locking movement of said lever to said link, means for rotating said cam to actuate said operating rod and close said fruit grasping elements upon a fruit, a light source, a light responsive receiver, a yieldable inspector adapted to probe the surface of a fruit while said fruit is being oriented, light interrupting means actuated by said inspector to terminate passage of light from said light source to said receiver when a fruit is misaligned, claw means for disengaging said latch, and means for moving said claw means into a latch disengaging position when light passage to said receiver is interrupted.

23. In combination, continuously moving fruit supporting means, means movable with said supporting means to orient the stem indent of the fruit to a predetermined position, a continuously moving conveyor, transfer means operable in timed relation to said continuously moving fruit supporting means and said continuously moving conveyor to transfer the fruit so oriented from the supporting means to the conveyor to present the fruit to the said conveyor in a predetermined oriented position relative thereto, means operable for disenabling said transfer means, and means for actuating the disenabling means, the latter said means being operable in accordance with the position of the fruit on the supporting means so that a fruit which is misaligned on the supporting means remains thereon due to the disenabling of the transfer means.

24. In combination, continuously moving fruit supporting means, means movable with said supporting means to orient the stem indent of the fruit to a predetermined position, a continuously moving conveyor, transfer means operable in timed relation to said continuously moving fruit supporting means and said continuously moving conveyor to transfer the fruit so oriented from the supporting means to the said conveyor to present the fruit to the said conveyor in a predetermined oriented position relative thereto, means for disenabling the transfer means, means for actuating said disenabling means in accordance with the position of the fruit on the supporting means so that when a fruit is in non-oriented position on the supporting means the transfer means is disenabled whereby the fruit remains upon the supporting means and the misaligned fruit is not transferred to the said conveyor.

25. In a fruit processing machine, the combination of a fruit support adapted to receive a fruit, means on the supporting means for rotating the fruit, means in the supporting means for scanning the surface of the fruit to orient the same with reference to its stem indent and plane of suture of the fruit, means for halving the fruit in its plane of suture, transfer means operable in timed relation with the fruit orienting means and the fruit halving means for transferring the oriented fruit from the fruit supporting means to the halving means to present the fruit to the halving means in oriented position, and means operably connected between the fruit supporting means and the transfer means for disenabling the transfer means when a fruit is supported in misaligned position on the supporting means.

26. A fruit inspecting device comprising: a yieldable inspector adapted to probe the surface of a fruit while said fruit is being oriented, means for projecting a light beam, and light interrupting means operatively connected to and actuated by movement of said inspector into the calyx indent of a fruit to interrupt said light beam.

References Cited in the file of this patent

UNITED STATES PATENTS

| | | |
|---|---|---|
| 1,833,623 | Smith | Nov. 24, 1931 |
| 2,205,397 | Drake | June 25, 1940 |
| 2,232,210 | Carroll | Feb. 18, 1941 |
| 2,296,645 | Marsden | Sept. 22, 1942 |
| 2,352,091 | Fedorchak | June 20, 1944 |
| 2,371,748 | Fedorchak | Mar. 20, 1945 |
| 2,420,659 | Ewald | May 20, 1947 |
| 2,529,081 | Hughes et al. | Nov. 7, 1950 |
| 2,568,947 | Carroll | Sept. 25, 1951 |
| 2,582,494 | Lorenz | Jan. 15, 1952 |
| 2,609,913 | Doering et al. | Sept. 9, 1952 |
| 2,649,880 | Ewald et al. | Aug. 25, 1953 |
| 2,731,129 | Carroll | Jan. 17, 1956 |
| 2,788,818 | Skog | Apr. 16, 1957 |

FOREIGN PATENTS

| | | |
|---|---|---|
| 148,495 | Australia | Oct. 2, 1952 |